Figure 1:
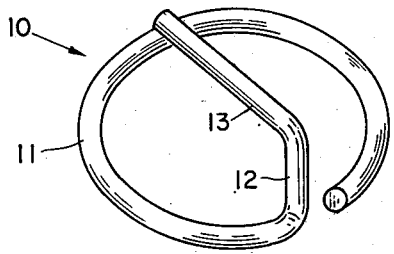

May 6, 1958 — R. Q. WILLIAMS — 2,833,172
LOCK RING INSTALLATION TONGS

Filed Feb. 17, 1955 — 2 Sheets-Sheet 1

INVENTOR.
ROGER Q. WILLIAMS

May 6, 1958 R. Q. WILLIAMS 2,833,172
LOCK RING INSTALLATION TONGS
Filed Feb. 17, 1955 2 Sheets-Sheet 2

INVENTOR.
ROGER Q. WILLIAMS

United States Patent Office 2,833,172
Patented May 6, 1958

2,833,172

LOCK RING INSTALLATION TONGS

Roger Q. Williams, Oakland, Calif.

Application February 17, 1955, Serial No. 489,003

4 Claims. (Cl. 81—10)

(Granted under Title 35, U. S. Code (1952), sec. 266)

The invention described herein may be manufactured and used by or for the Government of the United States of America for governmental purposes without the payment of any royalties thereon or therefor.

The present invention relates to lock ring installation tongs and more particularly to tongs having two jaws so constructed and arranged that they are adapted to cooperate with a special type of lock ring to force the ring into proper position for installation on a nut and bolt assembly.

In many mechanical applications, nut and bolt assemblies are subjected to various forces such as friction, vibration, centrifugal force and so forth which tend to loosen the nut on the bolt. As a consequence, various devices have been provided for preventing the nut from becoming loose on the bolt. Prior art devices for this purpose have employed cotterpins, tapered split pins, gang-type of safety wire threaded through the castellations of nuts and into holes provided in the bolts, and other similar devices. Such prior art devices have proven disadvantageous since they do not satisfactorily withstand vibrations, shock loads and especially the stress of passing through viscous fluids such as oil or grease.

Accordingly, a new type of lock ring has been developed for the above purpose. This new lock ring consists of a novel shaped spring member which is adapted to remain securely in place about a nut and has a portion which passes through the castellations of the nut into a cooperating hole in the bolt for maintaining the nut in position on the bolt at all times. This lock ring has proven very satisfactory in service and has overcome the limitations found in prior art devices; however, assembly of the lock ring has created a special problem since it must be forced into operative position relative to the nut and bolt in order to be properly assembled.

Consequently, a new type of tongs has been developed according to the present invention for mounting this type of lock ring in operative position. No present type of tongs is suitable for this purpose and the invention device has been provided to solve this specific problem.

The invention tongs employ a novel arrangement whereby the lock ring is maintained securely in place and which enables the lock ring to be distorted into the proper position such that it may be inserted in a nut and bolt assembly. The tongs thereby provide a means whereby the lock ring may be quickly and efficiently installed in a nut and bolt assembly.

An object of the present invention is the provision of new and novel tongs adapted to support and distort a special type of lock ring into position for installation on a nut and bolt assembly.

Another object is to provide tongs which are simple and inexpensive in construction, yet sturdy and efficient in operation.

Figure 2:
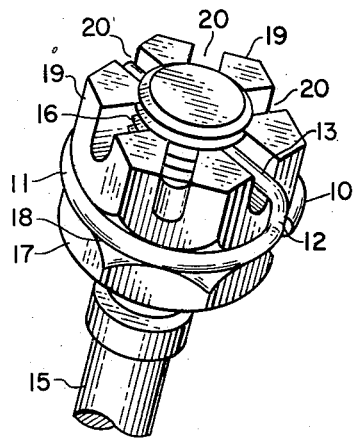
Figure 3:
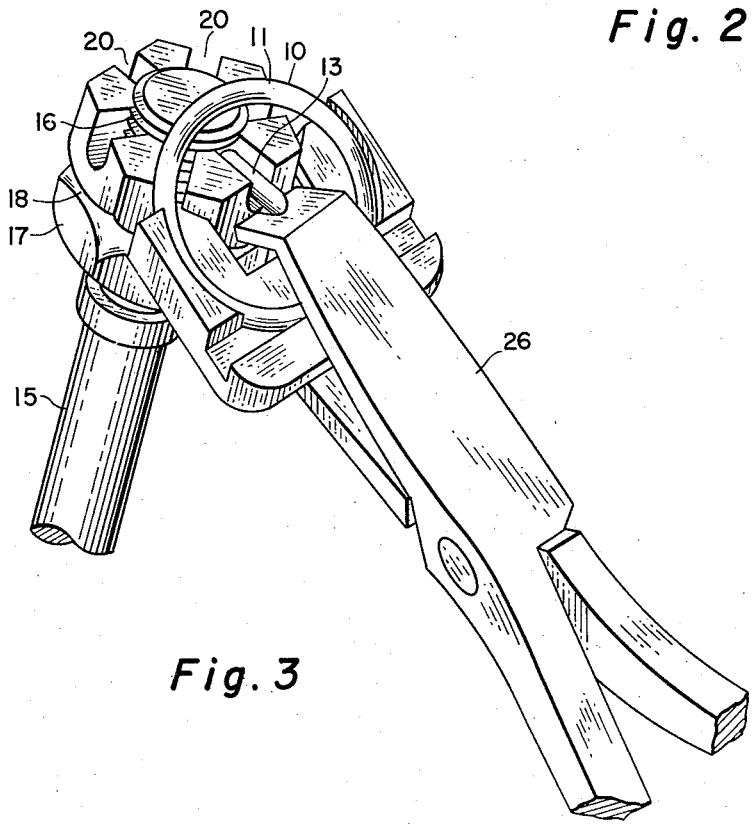
Figure 4:
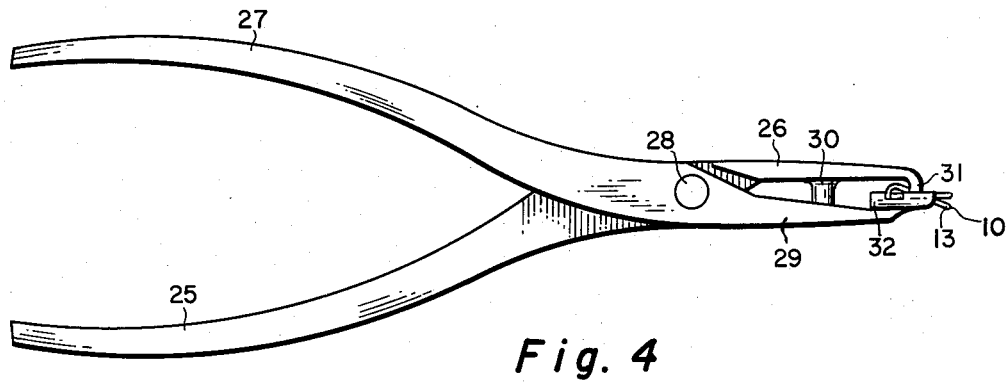
Figure 5:
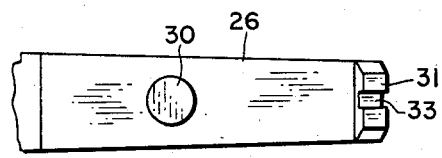
Figure 6:
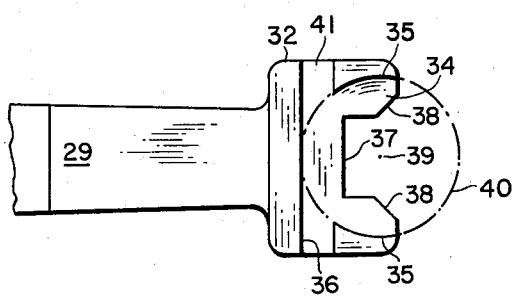

Other objects and many of the attendant advantages of this invention will be readily appreciated as the same becomes better understood by reference to the following detailed description when considered in connection with the accompanying drawings wherein:

Fig. 1 is an isometric view of a special type of lock ring adapted for use with the invention device, Fig. 2 is an isometric view of the lock ring in position on a nut and bolt assembly, Fig. 3 is a view showing the lock ring being mounted on a nut and bolt assembly with the aid of the invention tongs, Fig. 4 is a side view of the invention device with a lock ring in operative position between the jaws thereof, Fig. 5 is a bottom plan view of one of the jaws of the invention device, and Fig. 6 is a top plan view of the other of the jaws of the invention device.

Referring now to the drawings wherein like reference characters designate like or corresponding parts throughout the several views, there is shown in Fig. 1 a new type of lock ring 10 which consists of a unitary piece of resilient material such as spring steel or the like having a substantially circular portion 11 one end of which has an upwardly extending portion 12 which is bent at a 90° angle to the plane of portion 10 and terminates in a second bent portion or tongue which is bent at a 90° angle to portion 12 and extends diametrically inward of circular portion 10 in a plane parallel thereto. It should be noted that the length of the tongue is substantially equal to the inner diameter of the circular portion of the lock ring whereby the tongue is adapted to extend entirely through a bolt and engage cooperating openings in diametrically opposite portions of a nut mounted thereon.

Referring now to Fig. 2, there is shown a nut and bolt assembly including a bolt 15 having a threaded end portion 16 and a nut 17 threaded thereon. The nut has a circumferential groove 18 formed therearound and a plurality of castellations 19 are formed on the upper portion of the nut, each castellation having a groove 20 formed diametrically therethrough. Circular portion 11 of the lock ring seats tightly in groove 18, the portion 12 of the lock ring extending longitudinally along the outer periphery of the nut, and the tongue 13 of the lock ring extending through diametrically opposite grooves 20 formed in the nut and a cooperating hole (not shown) formed diametrically through the bolt and aligned with the grooves. It is evident that the lock ring provides a means whereby the nut is securely locked on the bolt and the assembly is enabled to withstand the various forces to which it may be subjected without causing the nut to loosen on the bolt.

It is apparent that the lock ring must be distorted in order for it to be assembled as shown in Fig. 2 in a nut and bolt assembly. Referring now to Fig. 3, the lock ring is shown in position within the jaws of the novel tongs, hereinafter more fully described wherein tongue 13 of the lock ring has been forced downwardly below the plane of circular portion 11 of the lock ring such that tongue 13 may be inserted through one of the grooves 20 and into the aligned hole in the bolt. When the tongue of the lock ring is so inserted, portion 11 of the lock ring lies across the top of the nut and bolt assembly as shown in Fig. 3 whereupon the tongs are removed and the lock ring forced over the far end of the nut by the use of a thin, elongated instrument such as an ice pick or the like, and the lock ring slides down along the outer surface of the nut into groove 18.

Fig. 4 is a side view of the novel tongs of the invention as shown in Fig. 3 with the lock ring 10 compressed in place within the jaws of the tongs and the tongue 13 of the lock ring extending down below the plane of circular portion 11. The tongs comprise a first lever 25 having a jaw 26 formed integrally therewith and a second lever 27 pivoted by pin 28 to lever 25 and having a jaw 29 formed integrally therewith. A stop member 30 is secured to and extends downwardly from jaw 26 and the lower surface of the stop member is sloped such that in the limit position shown, it mates with the upper sloping surface of jaw 29. The outer end of jaw 26 has a downwardly extending flange 31 secured thereto, and jaw 29 has a support member 32 secured to the upper portion thereof.

Fig. 5 shows a plan view of jaw 26 and it may be seen that the downwardly extending flange 31 has a notch 33 formed centrally in the lower surface thereof. Stop member 30 is mounted along the longitudinal axis of lever 25.

Fig. 6 shows a top plan view of jaw 29 and support member 32 mounted thereon, and it may be seen that a recess 34 is formed in the upper surface of the support member having arcuate wall portions 35 and a back wall 36. A cutout portion 37 is formed completely through the central part of the outer end of the support member in order that the tongue of the lock ring may be forced downwardly as shown in Fig. 4, and the cutout portion has two beveled surfaces 38 which are adapted to receive the castellations of a nut as shown in Fig. 3 whereby the tongs may be pushed toward the nut to the extent necessary to insert the lock ring in proper position within the nut and bolt assembly.

Point 39 is the center of a circle indicated by phantom line 40 and it may be seen that arcuate wall portions 35 lie on the circumference of the circle and back wall 36 is tangent thereto. The diameter of circle 40 is slightly larger than the outside diameter of the circular portion of the lock ring such that when the lock ring is distorted into position as shown in Figs. 3 and 4, the circular portion may give slightly and expand into a position where the outer surface of the circular portion engages walls 35 and 36. When the lock ring is inserted in a nut and bolt assembly as shown in Fig. 3, the circular portion of the lock ring remains tightly wedged against walls 35 and 36 making it difficult to remove the lock ring from the tongs. Accordingly, grooves 41 are provided in the support member and extend outwardly through the side walls thereof from recess 34 such that a suitable means such as an ice pick or the like may be inserted under the circular portion of the lock ring to pry the ring out of the support member.

The operation of the device is as follows:

The circular portion of a lock ring is inserted in the recess 34 of the support member on jaw 29 and the tongue 13 of the lock ring is aligned such that it fits within notch 33 of jaw 26. Levers 25 and 27 are then manually squeezed together until the lower surface of stop member 30 engages the upper surface of jaw 29 whereupon the lock ring will be in the position shown in Figs. 3 and 4 such that it may be inserted in place in the nut and bolt assembly.

It is apparent from the foregoing that there are provided new and novel tongs which are adapted to support and distort a special type of lock ring into such a position that it may be quickly and efficiently installed in a nut and bolt assembly. The tongs are simple and inexpensive in construction, yet sturdy and efficient in operation.

Obviously many modifications and variations of the present invention are possible in the light of the above teachings. It is therefore to be understood that within the scope of the appended claims the invention may be practiced otherwise than as specifically described.

I claim:

1. A pair of tongs which comprises a first lever having a first jaw formed on one end thereof, a second lever pivotally connected to said first lever and having a second jaw formed on one end thereof, said second jaw having an upper surface facing said first jaw, said first jaw having a notch located centrally in the outer end thereof, said second jaw having an opening in the outer end thereof, and a recess having arcuate wall portions formed in said upper surface for receiving a substantially circular portion of a lock ring member.

2. A pair of tongs which comprises a first lever including a first jaw formed on one end thereof having a substantially flat body portion, a second lever pivotally connected to said first lever and having a second jaw formed on one end thereof, said second jaw having an upper surface facing said first jaw, said first jaw having a flange extending at an oblique angle with respect to said body portion toward said second jaw, said flange having a notch disposed centrally therein, said second jaw having an opening centrally located in the outer end thereof, and a recess having arcuate wall portions formed in said upper surface adjacent said opening for receiving a substantially circular portion of a lock ring member.

3. A tong for installing a lock ring having an inwardly directed tongue portion over a nut, said tong comprising a pair of pivoted levers having facing jaws movable toward each other, the face of one of said jaws having a ring supporting surface, said one jaw having an open-ended cutout portion adapted to lie at least partly within the perimeter of the ring in said supported position, the other jaw having a depending tongue engaging portion for depressing said tongue through the ring, said tongue engaging portion being of a size capable of projecting into said cutout portion of the one jaw when the jaws are moved together.

4. The tong of claim 3 wherein each jaw is provided with a means for restraining lateral movement of the respective ring portions during closing movement of the jaws.

References Cited in the file of this patent

UNITED STATES PATENTS

| 669,608 | Williams | Mar. 12, 1901 |
| 950,849 | Hammond | Mar. 1, 1910 |
| 1,069,106 | Brice | Aug. 5, 1913 |
| 1,299,103 | Angle | Apr. 1, 1919 |
| 1,455,700 | Adams | May 15, 1923 |
| 1,611,408 | Bowers | Dec. 21, 1926 |
| 1,882,095 | Reggitts | Oct. 11, 1932 |
| 1,886,732 | Poland | Nov. 8, 1932 |

FOREIGN PATENTS

| 118,696 | Australia | July 11, 1944 |